J. M. ROTH AND A. H. YOCUM.
AUTOMATIC PHONOGRAPH STOP.
APPLICATION FILED FEB. 1, 1919.
1,333,997.
Patented Mar. 16, 1920.
3 SHEETS—SHEET 1
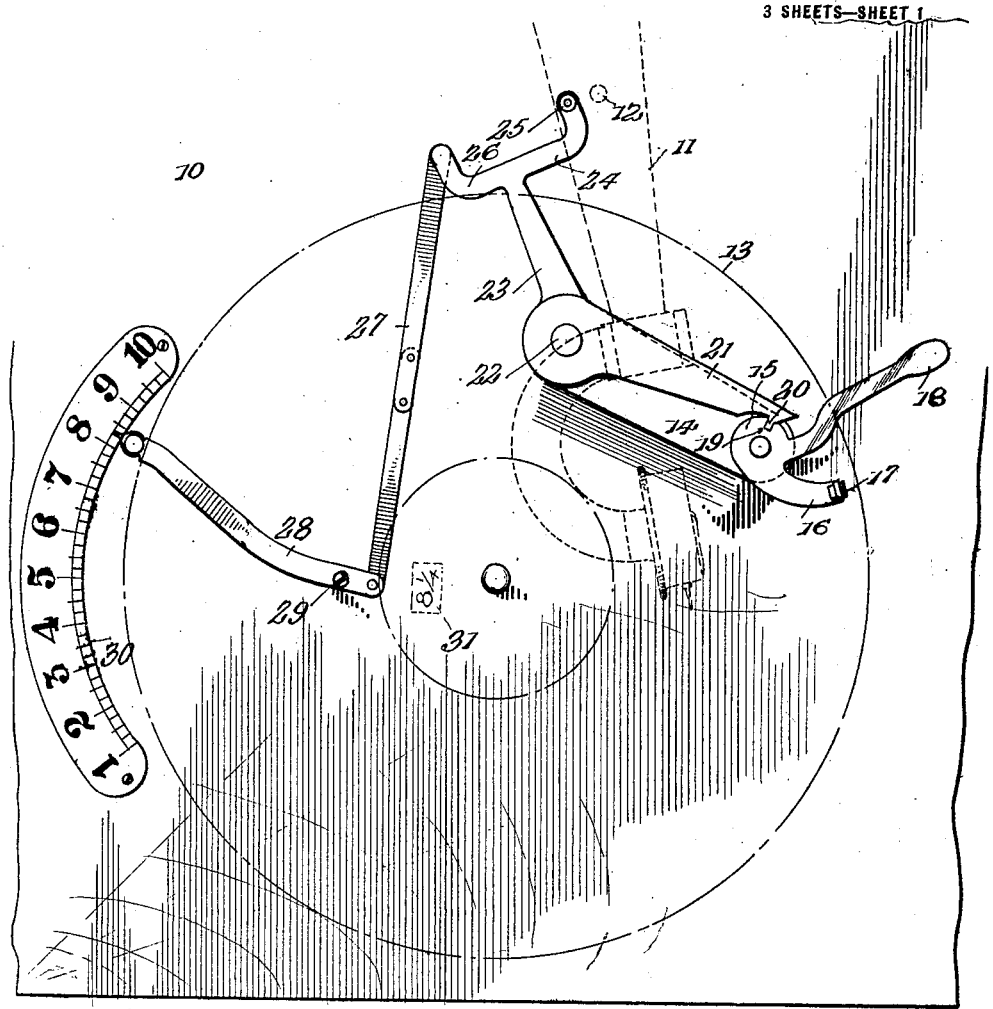
Fig. 1.
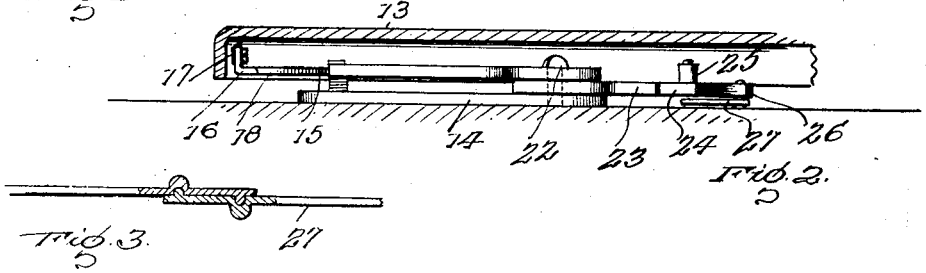
Fig. 2.
Fig. 3.
Witnesses
Inventors,
Joseph M. Roth
Arthur H. Yocum
by
Attorney.

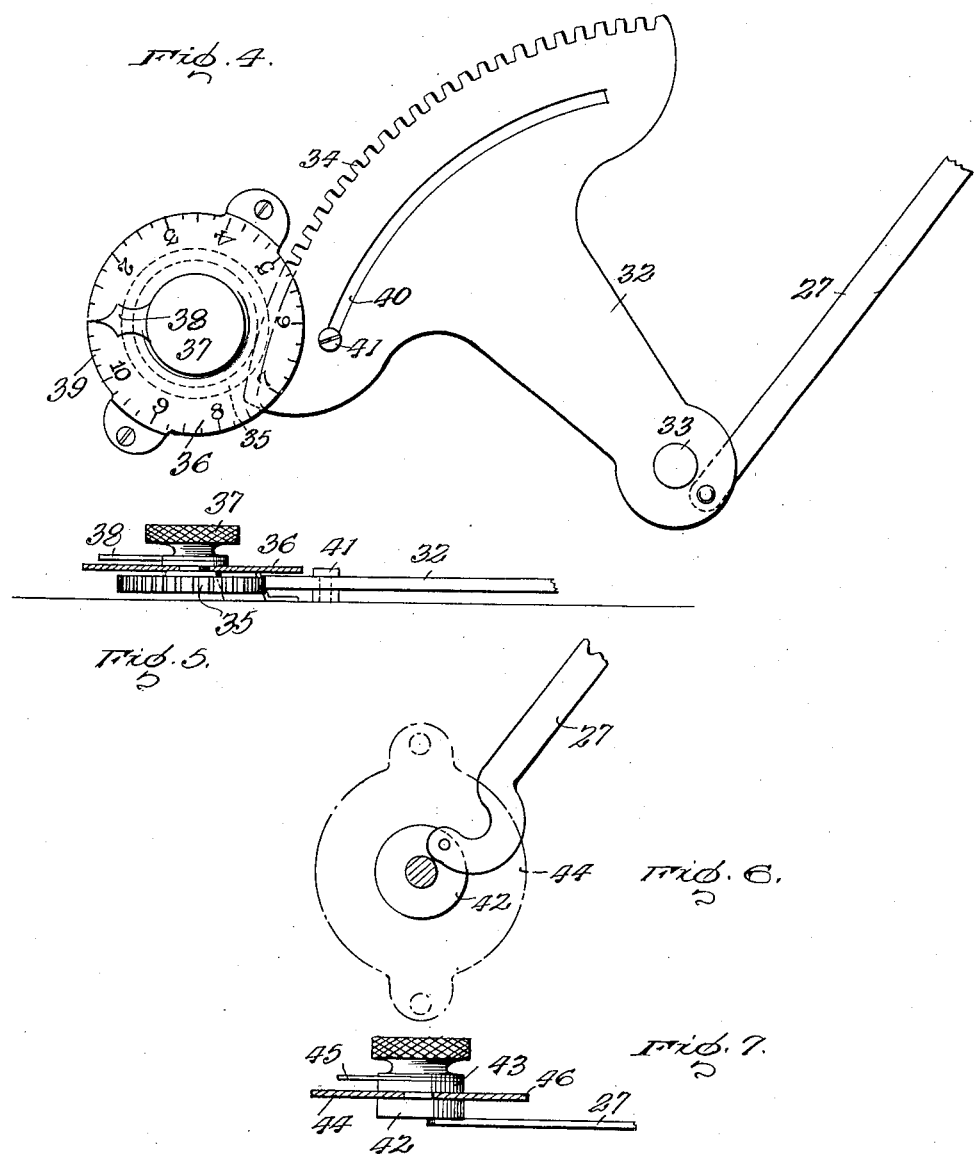

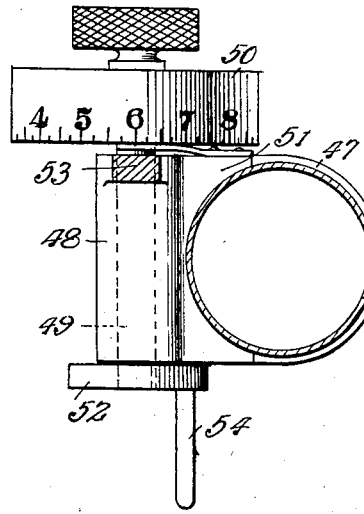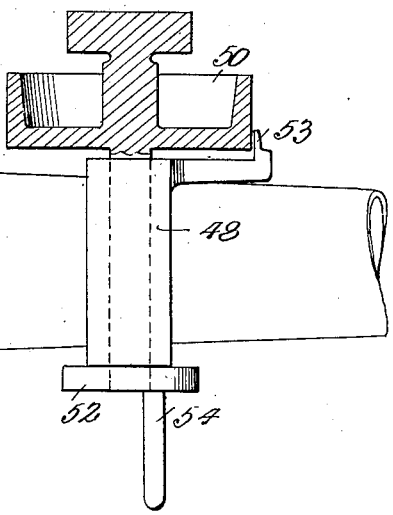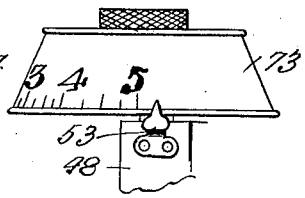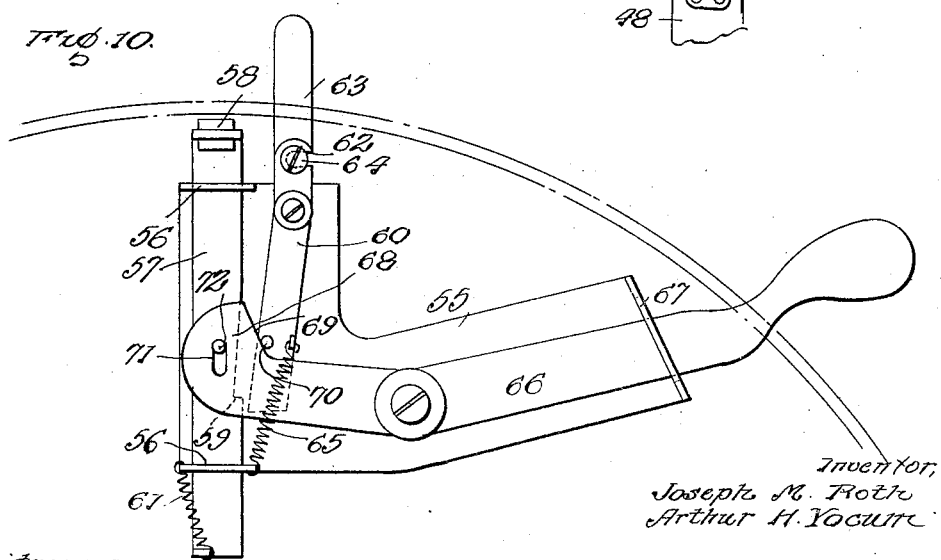

UNITED STATES PATENT OFFICE.

JOSEPH M. ROTH, OF RIDGEWOOD, AND ARTHUR H. YOCUM, OF NEW YORK, N. Y.

AUTOMATIC PHONOGRAPH-STOP.

1,333,997.  Specification of Letters Patent.  Patented Mar. 16, 1920.

Application filed February 1, 1919. Serial No. 274,398.

*To all whom it may concern:*

Be it known that we, JOSEPH M. ROTH and ARTHUR H. YOCUM, citizens of the United States, residing at Ridgewood, L. I., and New York city, in the county of New York and State of New York, have invented certain new and useful Improvements in Automatic Phonograph-Stops, of which the following is a specification.

This invention has relation to automatic stops for sound reproducing machines, and has for an object to provide a device which will operate positively to discontinue motion of the turn table as soon as the record has stopped playing or before the reproducing needle reaches the innermost groove thereof.

Another object of the invention is to provide an automatic stop of the character above set forth including an indicating means which is adjusted for each record played and in accordance with indicia on the record and on the indicating device, thereby obviating the necessity of first adjusting the reproducing needle to the point where the record ceases playing as required in devices of this character heretofore provided.

A still further object of the invention is to provide an automatic stop for sound reproducing machines of the character above set forth, adapted to be associated with a braking mechanism of conventional type, or with parts of conventional forms of automatic stops or other devices at present in existence the addition or improvement consisting in a scale and pointer movable thereacross whereby the scale may be set opposite an index number corresponding to the number previously applied to the particular record which is to be played whereby the automatic stop will operate to apply the brake as soon as the record ceases playing or before the reproducing needle arrives at the last groove.

A still further object of the invention is to provide an automatic stop and indicating device in the nature of an attachment which may be applied to any form of sound reproducing machine.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear, Figure 1 is a view in top plan of the baseboard of a sound reproducing machine with the turn table removed and illustrating the association of our invention with a standard form of automatic stop.

Fig. 2 is a detail view in side elevation of the braking mechanism and associated parts.

Fig. 3 is a detail view of the sectional link forming a part of our invention.

Fig. 4 is a view in top plan of a modified form of indicating mechanism.

Fig. 5 is a view thereof in side elevation.

Fig. 6 is a view in top plan on a still further modified form of indicating mechanism.

Fig. 7 is a detailed view thereof in side elevation.

Fig. 8 is a view in front elevation of a still further modified form of our invention showing the tone arm in section.

Fig. 9 is a view thereof in side elevation.

Fig. 10 is a horizontal section taken on the line 10—10 of Fig. 8.

Fig. 11 is a view of a modified form of indicating dial.

With reference to Fig. 1 of the drawings, 10 indicates the baseboard of a sound reproducing machine and 11 the tone arm having a pin 12 depending from the underside thereof. The turntable upon which the record is placed is indicated in dotted lines at 13, and disposed therebeneath is a portion of an automatic stop of conventional type comprising a base plate 14 upon which is pivotally mounted a disk 15 carrying an arm 16 which is provided with a friction element 17 designed to bear against the inner surface of the rim of the turn table 13 to arrest motion thereof. The disk 15 also carries a radially extending finger 18 whereby the brake may be manually adjusted. The disk 15 is also provided with a peripheral notch 19 in which the finger 20 of an arm 21 is designed to engage to retain the arm 16 out of contact with the turn table, the said arm being urged toward said contact by means of a spring (not shown). The arm 21 is rotatable about the pivot point 22 and formed with a broad friction face for engagement with a similar friction face formed upon an arm 23 which extends substantially toward the center of motion of the tone arm 11, and is provided with a lateral extension 24 which is in the path of movement of the pin 12 depending from the tone arm. Thus, upon engagement of the pin 12 with extension 24, the arm 23 is rotated, and owing to the friction of its face with the arm 21 the latter is also rotated to withdraw the pin 20 from the notch 19, permitting the brake to actuate in the manner set forth above. The arm 23 is also formed with a lateral extension 26 extending oppositely to the extension 24, and pivotally connected to the extension of said portion 26 is a link 27 consisting of a pair of members having their adjacent ends in overlapping engagement, and said ends connected through the medium of snap fasteners or any other suitable means. The opposite end of the link 27 is connected to an indicator arm 28 which is fulcrumed as at 29 upon the baseboard of the instrument and at a point closely adjacent to the point of connection thereto of the link 27. The opposite end of the indicating arm 28 is extended beyond the periphery of the platform 13 and is pointed to indicate indicia upon an arcuate scale 30 graduated in halves and quarters as shown.

In the use of this improvement it is necessary to mark each record with a numeral indicating the point at which the arm 28 must be placed in order to insure stoppage of the mechanism when the record has finished playing. To this end a label 31 is applied to the record, and the record placed upon the turn-table. The tone arm is then swung toward the center whereupon the pin 12 engages the arm 25, causing the arm 28 to swing across the dial 30 until the reproducing needle is brought to the point when the record ceases playing whereupon the numeral or fraction thereof opposite the end of the arm 28 is noted and then applied to the label 31. Whenever this particular record is played the arm 28 is brought opposite the numeral on the dial corresponding to the numeral upon the label 31. Obviously, when the record has finished playing, or before the reproducing needle has reached the innermost groove the pin 12 will engage the arm 24 swinging the arm 23 in a counter-clock-wise direction, the motion of which is communicated to the arm 21 to swing the same outward so as to disengage the finger 20 from without the notch 19. In this manner the brake arm 15 is released, permitting the same to contact with the inner periphery of the platform 12 whereby motion of the latter ceases. Obviously, each record must be supplied with a numeral indicating the point at which the arm 28 must be set in order to insure cessation of motion of the turn-table when the record is finished, but if the arm 28 is adjusted for each record played obviously the mechanism will operate positively, and as the arm 28 may be readily and quickly adjusted to the number indicated upon the record the advantages of this particular improvement will be obvious.

We have illustrated in Figs. 4 and 5 of the drawings a modified form of indicating device in which a lever 27 is connected to one end of a segment gear 32, pivotally mounted at 33 and having a series of gear teeth 34 upon its outer periphery for meshing engagement with the teeth of a relatively smaller gear 35 which may be pivoted in a bridge 36 mounted upon the baseboard of the instrument. The gear 35 is provided with an operating knob 37, and also a pointer 38 which is movable adjacent a dial or series of graduations 39, marked upon the upper surface of the bridge plate 36. By rotating the knob 37 the motion thereof is communicated through the gear 35 to the segment gear 32, oscillating the same in one direction or the other as the case may be to shift the link 27 and consequently adjust the arm 23 toward or away from the point at which the arm 25 may be engaged by the pin 12. In this manner the balance of the mechanism is operated the same. In order to guide the segment 32 for movement it may be formed with an arcuate slot 40 through which a headed pin 41 projects.

In Figs. 6 and 7 of the drawings we have illustrated a still further form of indicating mechanism in which the link 27 is eccentrically connected to a disk 42 formed upon the lower end of an operating knob 43, the latter being journaled in a bridge plate 44 mounted upon the baseboard of the instrument. A pointer 45 is associated with the knob 43 to travel over a series of graduations or dial plate 46 mounted upon the bridge plate 44. Obviously, by rotating the knob 43 the link 27 is shifted longitudinally in one direction or the other and the automatic stop mechanism is set for particular operation in the manner noted above.

We have illustrated in Figs. 8 to 10 inclusive a still further modified form of our invention which is in the nature of an attachment, designed particularly to be mounted upon the tone arm of any form of sound reproducing machine. To this end a split clamp 47 is provided to encircle the tone arm, said clamp extending laterally from a vertical bearing member 48 which supports a vertical shaft 49 extending therethrough. Mounted or formed upon the upper end of said shaft is a cylindrical dial 50 having numerals and fractions inscribed upon its outer periphery. A flat spring 51 is secured at one end to the clamp and bears against the underside of the dial to urge the same and the shaft upwardly, such movement being limited by the provision of a disk 52 mounted upon the lower end of said shaft. A pointer 53 is extended laterally from the member 48 and is brought into close proximity to the periphery of the dial. A pin 54 is mounted upon the disk eccentrically and depends therefrom to engage a novel braking mechanism of our invention now to be described.

An angular base plate 55 is mounted upon the base board or other part of the sound reproducing machine, one arm of said base plate having opposite ends up-set as at 56 to form slotted guide ways for a brake bar 57 which moves substantially radially relative to the center of rotation of the turn table and is provided at one end with a friction pad or the like 58 designed to engage the rim of the turn table. One side of the brake bar 57 is formed with a shoulder 59, and pivotally mounted upon the base plate adjacent the bar 59 is a trip bar 60, one end of which is designed to engage against the shoulder 59 to retain the brake bar 57 in a retracted position and against the tension of a spring 61 provided for that purpose The opposite end of the locking bar 60 is extended beyond the fulcrum point and formed with a lateral extending slot or notch 62. Also fulcrumed upon the same point upon which the bar 60 is fulcrumed is a second bar 63 forming a portion of the trip bar and having a screw 64 threadedly engaged therein in a position to enter the notch 62 whereby, upon tightening said screw the bars 60 and 63 are locked together against relative movement. To retain the bar 60 in the notch 59 a coiled spring 65 is provided having one end connected to the lower guide member 56 and its opposite end to said bar 60 as shown in the drawings. Also pivotally mounted upon the angular plate 55 is a cam lever 66 having one end extended through a slotted guide 67 formed by turning up the end of the other angular portion of the plate 55, while the opposite end of the cam lever is formed with a laterally extending portion 68 which is formed with a cam edge 69 designed to engage against an upstanding pin 70 provided upon the bar 60. The lateral portion 68 is also formed with a slot 71 through which a pin 72 projects, the latter extending upwardly from the brake bar 57.

In operation it will be apparent that as the dial 50 is rotated the pin 54 will be positioned toward or away from the tone arm so as to engage any abutment that may be provided to engage the same sooner or later during the period of travel of the tone arm and during the playing of a record. The braking mechanism just described is mounted so that the extended end 63 of the trip bar is in the path of movement of said pin 54 whereupon engagement of the latter with said end 63 the locking bar will be rocked so as to disengage the opposite end thereof from the notch 59, permitting the braking bar 57 to move forward under the tension of the spring and to engage the turn table to prevent further movement of the latter. In order to release the brake without utilizing the automatic stop or, in other words to manually release the brake the projecting end of the cam bar 66 is moved whereupon the cam edge 69 thereof engages the pin 70, causing the trip bar 62 to move away from the shoulder 59 thereby releasing the brake bar 57 in the same manner. The extension 63 of the trip bar with the pin and slot connection 62 and 64 is provided in order that the turn table may be raised where sound reproducing machines are formed so as to permit the base board to be elevated. In this case the extension 63 would be turned aside after loosening the screw 64 thereby permitting the turn table to be raised.

We have illustrated in Fig. 11 of the drawings a modified form of the dial 50 shown in Figs. 8 and 9 in which the dial is formed in a conical manner as indicated at 73 in order that the numerals inscribed upon its surface may be more easily read from above.

It will be apparent that with the devices last described any sound reproducing machine may be supplied with an automatic stop of the type set forth above. No alteration in the structure of the machine is required.

From the foregoing it will be apparent that we have provided an automatic stop of a new and novel character wherein the essential feature consists in the provision of an indicating means such as the arcuate, circular, cylindrical or conical dials bearing numerals whereby each record may be supplied with a numeral determined by experiment so that when the indicating dial is set to a point corresponding to said numeral the talking machine will stop when the record ceases playing. In conjunction with any of the indicating means set forth it will be obvious that we may employ the form of braking mechanism shown in Fig. 2 as well as many other forms of braking mechanisms now in use, or we may employ the specific braking mechanism shown in Fig. 10. The advantages of this method of setting an automatic stop will be obvious when it is remembered that it is not necessary to set the reproducing needle in or near the last groove of the record each time it is played with the possibility that the automatic stop will not operate as intended. With our invention, the indicating device may be quickly adjusted to the numeral corresponding to the one on the record with the assurance that the automatic stop will operate to stop the machine at the same place during the playing of the record each time it is played. Furthermore, the numerals on the indicating device being large, the pointer may be quickly adjusted and a saving of time is thus effected. Other uses and advantages will readily occur to those skilled in the art to which this invention appertains.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit of the invention or the scope of the appended claims.

Having thus described our invention, what we claim as new and desire to secure by United States Letters Patent is:

1. An attachment for sound reproducing machine comprising a sleeve, means on said sleeve to embrace the tone arm to mount the sleeve thereon, a shaft rotatably mounted in the sleeve, a hollow frusto conical drum formed integrally with the shaft and opened in its top side and carrying a plurality of graduations on its outer face, a knob connected centrally and integrally with the drum, a spring finger mounted on the sleeve and engaging the underside of the drum to urge the same upward, an arm extending radially from the sleeve and carrying an upstanding finger located in proximity to the graduated surface of the drum, a disk secured to the lower end of the shaft, and a pin depending eccentrically from the disk.

2. An automatic stop for sound reproducing machines comprising an angular base plate having a pair of upstanding guide members, a brake bar slidable in said guide members having a notch in one side, a pin extending upward from said brake bar, a lever fulcrumed upon the plate and adapted to enter the notch, said lever having a notch formed laterally in one end, a pin extending from the lever at the opposite end, an arm fulcrumed about the fulcrumed point of the lever, a screw passing through the notch of the lever and entering the arm, a second lever fulcrumed on the plate and having a cam surface to engage the second mentioned pin and a slot to receive the first mentioned pin, and springs to urge the brake bar outward and to urge the first mentioned lever to the notch.

In testimony whereof we affix our signatures in presence of two witnesses.

JOSEPH M. ROTH. [L. S.]
ARTHUR H. YOCUM.

Witnesses:
JACOB J. SEIBEL,
CHARLES F. BRUCKER.